United States Patent
Kaul (10) Patent No.: US 10,635,477 B2
(45) Date of Patent: Apr. 28, 2020

(54) DISABLING IN-MEMORY CACHING OF A VIRTUAL MACHINE DURING MIGRATION

(71) Applicant: Red Hat Israel, Ltd., Raanana (IL)

(72) Inventor: Yaniv Kaul, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 72 days.

(21) Appl. No.: 15/619,682

(22) Filed: Jun. 12, 2017

(65) Prior Publication Data
US 2018/0357092 A1 Dec. 13, 2018

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC .................................................. G06F 9/45558
USPC ........................................................ 718/1–108
See application file for complete search history.

(56) References Cited

U.S. PATENT DOCUMENTS

| | | | | |
|---|---|---|---|---|
| 6,182,086 B1* | 1/2001 | Lomet | ................. | G06F 11/1471 |
| 8,443,376 B2* | 5/2013 | Bhandari | ............. | G06F 9/5044 |
| | | | | 718/1 |
| 8,826,273 B1* | 9/2014 | Chen | .................. | G06F 9/45558 |
| | | | | 718/1 |
| 9,069,587 B2 | 6/2015 | Agarwal et al. | | |
| 9,336,035 B2 | 5/2016 | Zhou et al. | | |
| 9,578,032 B2 | 2/2017 | Beveridge et al. | | |
| 10,042,768 B1* | 8/2018 | Karnowski | ......... | G06F 12/0868 |
| 10,156,986 B2* | 12/2018 | Gopalan | ............. | G06F 11/1453 |
| 2003/0182427 A1* | 9/2003 | Halpern | ................ | G06F 9/4843 |
| | | | | 709/226 |
| 2011/0131568 A1* | 6/2011 | Heim | .................... | G06F 9/4856 |
| | | | | 718/1 |
| 2013/0111474 A1* | 5/2013 | Agarwal | ............ | G06F 9/45558 |
| | | | | 718/1 |
| 2014/0025890 A1 | 1/2014 | Bert et al. | | |
| 2014/0047183 A1* | 2/2014 | Chawla | ................ | G06F 12/084 |
| | | | | 711/119 |

(Continued)

OTHER PUBLICATIONS

Liao, Wei-keng, et al. "An implementation and evaluation of client-side file caching for MPI-IO." Parallel and Distributed Processing Symposium, 2007. IPDPS 2007. IEEE International. IEEE, 2007.pp. 1-10 (Year: 2007).*

(Continued)

*Primary Examiner* — Satish Rampuria
(74) *Attorney, Agent, or Firm* — Lowenstein Sandler LLP (57) ABSTRACT

Systems and methods for disabling in-memory caching of a virtual machine during migration are disclosed. An example method may include receiving, at a migration agent of a source host machine, a request to migrate a virtual machine (VM) hosted by the source host machine to a destination host machine, determining that a migration caching attribute of the VM is enabled, instructing a VM agent executing on the VM to disable caching of the VM in view of determining that the migration caching attribute of the VM is enabled, receiving acknowledgment of successful disablement of caching on the VM, and responsive to receiving the acknowledgment, initiating migration of the VM from the source host machine to the destination host machine.

17 Claims, 6 Drawing Sheets

(56) References Cited

U.S. PATENT DOCUMENTS

| | | | |
|---|---|---|---|
| 2014/0215459 A1* | 7/2014 | Tsirkin | G06F 9/45558 718/1 |
| 2015/0032836 A1 | 1/2015 | Venkatesan et al. | |
| 2016/0127495 A1 | 5/2016 | Tasoulas et al. | |

OTHER PUBLICATIONS

Amiri, Khalil, et al. "Dynamic Function Placement for Data-Intensive Cluster Computing." USENIX Annual Technical Conference, General Track. 2000.pp. 1-16 (Year: 2000).*

Michaud, Pierre, et al. "A study of thread migration in temperature-constrained nnulticores." ACM Transactions on Architecture and Code Optimization (TACO) 4.2 (2007): pp. 2-28. (Year: 2007).*

Pu, Yan, and Akihiro Nakao. "A deployable upload acceleration service for mobile devices." The International Conference on Information Network 2012. IEEE, 2012.pp. 350-353 (Year: 2012).*

Yang, Yaodong, et al. "WAIO: Improving virtual machine live storage migration for the cloud by workload-aware IO outsourcing." 2015 IEEE 7th International Conference on Cloud Computing Technology and Science (CloudCom). IEEE, 2015.pp. 314-321 (Year: 2015).*

Widlund, Simon, and Anton Annenkov. "Migrating a Single-core AUTOSAR Application to a Multi-core Platform: Challenges, Strategies and Recommendations." Gothenburg, Department of Computer Science and Engineering, Chalmers University of Technology (2017).pp. 1-61 (Year: 2017).*

Gustafsson, Erik, "Optimizing Total Migration Time in Virtual Machine Live Migration", http://www.diva-portal.org/smash/get/diva2:609356/fulltext01.pdf, 47 pages.

Shan, Amit, "Live Migrating QEMU-KVM Virtual Machines", https://developers.redhat.com/blog/2015/03/24/live-migrating-qemu-kvm-virtual-machines/, Mar. 24, 2015, 28 pages.

"Perform Live Migration on Linux KVM—Part 11", http://www.unixarena.com/2015/12/perform-live-migration-on-linux-kvm.html, Mar. 28, 2017, 4 pages.

\* cited by examiner

DISABLING IN-MEMORY CACHING OF A VIRTUAL MACHINE DURING MIGRATION

TECHNICAL FIELD

The disclosure is generally related to virtualization systems, and is more specifically related to disabling in-memory caching of a virtual machine during migration.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, etc.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for disabling in-memory caching of a virtual machine (VM) during migration. VM migration refers to the process of stopping execution of a VM at a first computing device (e.g., source host machine), transferring the state of the VM to a second computing device (e.g., destination host machine), and resuming execution of the VM at the second computing device. Live VM migration (also referred to as live migration) is a migration of a VM that occurs with minimal to no downtime (i.e., execution within the VM seemingly does not stop; VM continues to server clients) of the VM.

Migration of a VM between host machines involves saving the state of the VM executing on a source host machine and restoring the saved state of the VM on a destination host machine. A portion of a VM's state is data that the VM stores to disk. At least a portion of this data may be located in a cache in memory of the source host machine (may be referred to herein as in-memory cache). During the migration process, the VM and the VM's guest OS are executing and may continue performing disk input/output (I/O) operations for read and write requests. These disk I/O operations may include writing to pages in memory. The pages being written to are maintained in the cache and are referred to as dirty page cache entries when a write request is pending to disk for the page. Dirty page cache entries are re-transmitted during live migration to provide for memory integrity and consistency of the live migration. This retransmission of dirty page cache entries can negatively affect performance of the live migration by increasing the amount of time for the migration to complete, or even causing the migration to fail altogether.

Conventionally, live migration of a VM may not succeed because the VM's in-memory cache for disk I/O is being re-written to as I/O operations are taking place during the live migration process. Implementations of the disclosure improve the VM live migration process by disabling the in-memory caching of a VM during migration of the VM. A VM caching attribute is provided that, when set, can allow or prevent caching within the VM during live migration. In addition, implementations of the disclosure may further zero out memory pages in the VM cache so that these memory pages are not transferred during the live migration, thus reducing the amount of state that is to be transferred during the live migration. Disabling the VM's in-memory caching also slows down performance of applications executed by the VM as writes to disk and reads from disk take longer. This, in turn, causes the VM to re-write pages at a slower pace, resulting in quicker convergence and completion of the migration. Convergence in migration refers to the point at which the set of memory pages that has not yet been transferred becomes small enough that it can be transferred all at once within a chosen maximum downtime threshold, at which point the system may halt the source VM, transfer those remaining pages, and start the destination VM.

Implementations of the disclosure provide a technical improvement over the conventional systems by disabling in-memory caching of a VM during migration so that pages of the VM are re-written at a slower pace, which causes the migration to converge faster and complete more quickly. In addition, zeroing out the pages of the VM previously used for caching further improves migration because zero content pages are not transferred, thus saving on the amount of memory that is transferred as part of the migration (and thereby increasing speed of completion of the migration). As a result, more efficient usage of processing resources and a better overall user experience are provided.

Figure 1:
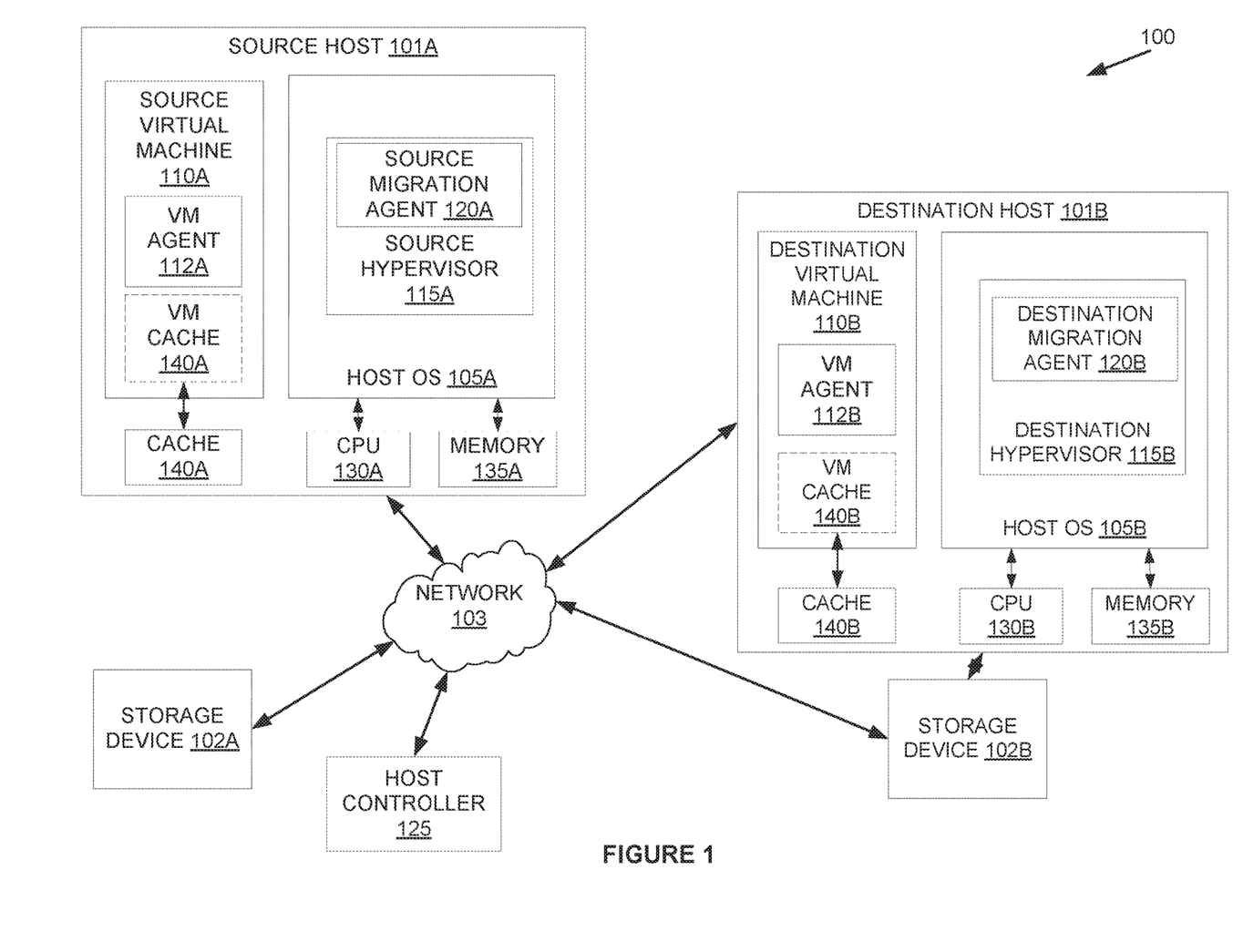
FIG. 1 depicts a high-level diagram of an example distributed computing system in accordance with one or more aspects of the disclosure.

FIG. 1 illustrates sample virtualization system 100 in which embodiments may operate. It should be noted that other architectures for virtualization system 100 (also referred to herein as system 100) are possible, and that the implementation of a computer system utilizing embodiments of the disclosure are not necessarily limited to the specific architecture depicted by FIG. 1.

The virtualization system 100 may include a source host computer system 101a (the "source host 101a"), a destination host computer system 101b (the "destination host 101b"), one or more storage devices 102 (e.g., 102a, 102b), and a host controller 125, which may all be communicably connected over a network 103. Each of host machines 101a and 101b may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable disabling in-memory caching of a VM during migration. The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host machines 101a and 101b may belong to a cluster comprising additional computer systems not depicted in FIG. 1, while in some other implementations, host machines 101a and 101b may be independent systems that are capable of communicating via network 103.

The source host 101a and the destination host 101b can include hardware components such as one or more physical central processing units (CPUs) 130a-130b, memory 135a-135b, and other hardware components. Memory 135a-135b may include volatile memory devices (e.g., random access memory (RAM)), non-volatile memory devices (e.g., flash memory), and/or other types of memory devices), and a storage device 180 (e.g., a magnetic hard disk, a Universal Serial Bus [USB] solid state drive, a Redundant Array of Independent Disks [RAID] system, a network attached storage [NAS] array, etc.). It should be noted that the fact that a single CPU is depicted in FIG. 1 for each of host machines 101a and 101b is merely illustrative, and that in some other examples one or both of host machines 101a and 101b may comprise a plurality of CPUs. Similarly, in some other examples one or both of host machines 101a and 101b may comprise a plurality of storage devices, rather than a single storage device.

A source host 101 can include one or more VMs 110a and can execute an operating system 105 ("host OS") to manage its resources. A VM 110a can execute a guest OS (not shown). In one embodiment, the source host 101a executes a source hypervisor 115a to virtualize access to underlying source host hardware, making the use of the source VM 110a transparent to the guest OS running on VM 110a and users (e.g., a system administrator) of the source host 101a.

Initially, as shown in FIG. 1, the source VM 110a is managed by the source hypervisor 115a. In one embodiment, a process is provided wherein the source VM 110a is migrated from the source hypervisor 115a residing on a source host OS 105a to the destination host 101b using at least one storage device 102 (storage devices 102a, 102b). Storage device 102 can be accessible by the source host 101a and by the destination host 101b. The storage device 102 can be networked storage (e.g., network attached storage (NAS), storage area network (SAN). The storage device 102 can be located with the source host 101a, within the same network as the source host 101a, with the destination host 102b, within the same network as the destination host 102b, or with a third location, to name a few examples.

The destination host 110b can include one or more VMs 101b executing under the control of a corresponding destination hypervisor 115b.

In one embodiment, the source hypervisor 115a may include a source migration agent 120a and the destination hypervisor 115b may include a corresponding destination migration agent 120b. The migration agent 120a, 120b can receive migration instructions from the host controller 125. The host controller 125 may reside on a designated computer system (e.g., a server computer, a desktop computer, etc.) or be part of the host machine 101a, 101b or another machine. Host controller 125 can manage VM migration by issuing instructions to hypervisor 115a, 115b. The host controller 125 can issue the migration instructions after a triggering event (e.g., a system administrator's migration request, system conditions, such as resource utilization by source host exceeding a threshold). The host controller 125 and migration agents 120 can work together to manage migrations, including determining a destination host machine 101b, coordinating one or more storage devices 102, scheduling migration, etc. Although shown as discrete components of the hypervisors 115a-115b, the migration agents 120a, 120b may be separate components coupled to hypervisors 115a-115b.

In accordance with one example, migration agent 120a, 120b is capable of cache management during a migration process of the VM 110a. For purposes of the below description, VM 110a is migrated from source host machine 101a to destination host machine 101b (And initialized as VM 110B at destination host 101b) during a migration process. As part of the migration process for the VM 110a, the state of the VM 110a at the source host machine 101a is saved (checkpointed) and restored at the destination host machine 101b. One portion of the VM 110a state may be data stored on disk (e.g., storage device 102a). Disk may refer to a local storage device and/or a shared storage device. Shared storage device may be accessible by more than one host machine 101a, 101b over network 103. Shared storage device may include, but is not limited to, a magnetic hard disk, a Universal Serial Bus (USB) solid state drive, a Redundant Array of Independent Disks (RAID) system, a network attached storage (NAS) array, etc.

As storage to disk can often be a time-consuming process, the VM 110a state data that is to be written to disk may be stored in a cache 140a prior to being written to disk. Cache refers to a hardware or software (instructions implemented by hardware) component that stores data in an interim location on the way to secondary storage (such as storage device 102a), so that future requests for that data can be served faster. The host OS 105a may maintain the cache 140a in otherwise unused portions of memory 135a, resulting in quicker access to the contents of the cached pages (contiguous blocks of virtual memory) and overall performance improvements. Cache 140a may be virtualized by source hypervisor 115a for use by VM 110a as VM cache 140a. In-memory cache may refer to storing data in memory as the interim location before being written out to secondary storage. In-memory caching may be referred to herein as simply caching.

As discussed above, conventionally, live migration of a VM 110a may not succeed because the VM's in-memory cache 140a for disk I/O is being re-written to as I/O is taking place. Implementations of the disclosure improve the VM 110a live migration process by disabling the VM's 110a in-memory caching during migration. A VM caching attribute (referred to herein as a migration caching disable attribute) is provided that, when set, can allow or prevent caching within the VM 110a during live migration. Disabling the VM's 110a in-memory caching slows down applications executed by the VM 110a as writes to disk take longer, which, in turn, causes the VM to re-write pages at a slower pace, causing the migration to converge and complete faster.

In one implementation, the source migration agent 120a of the source hypervisor 115a can receive a request from a host controller 125 to migrate virtual machine 110a from the source host 101a to the destination host 101b. In other implementations, the source host machine 101a or destination host machine 101b may initiate the migration process for migrating the VM 110a from source host 101 to destination host 101b. When the migration process for the VM 110a is initiated, the migration agent 120a examines a migration caching disable attribute of the VM to determine whether the attribute is enabled or set to prevent caching by the VM during migration. The migration caching disable attribute may be maintained as part of configuration information of the VM stored by the hypervisor 115a managing the VM 110a.

When the migration caching disable attribute is set, the migration agent 120a instructs a VM agent 112a to disable in-memory caching in the VM 110a. The VM agent 112a, in response to the instruction to disable in-memory caching, may synchronize the cache 140a (e.g., write back (flush) contents of cache to disk) and disable caching in the VM 110a. In one implementation, the VM agent 112a may disable caching in the VM 110a by modifying a caching primitive configured by the guest OS of the VM 110a. The caching primitive may include a dirty pages background ratio primitive. For example, in Linux™ OS, the dirty page background ratio is 'vm.dirty_background_ratio', which may be disabled by setting a value of this primitive to zero.

In some implementations, the VM agent 112a may further cause pages used for caching in the cache 140a of the VM 110a to be zeroed out. As a result, migration performance is improved because these zero content pages of memory are cleaned and do not have to be transferred as part of the migration.

Upon successful completion of disabling in-memory caching of the VM 110a, the VM agent 112a notifies the migration manager 120a of the successful disablement of the VM in-memory caching. The migration agent 120 may then proceed with initiating the migration process for the VM 110a and causing the state of the VM 110 to be transferred to the destination host machine 101b.

Destination host machine 101b, like source host machine 101a, executes a host OS 105b that manages the hardware resources (e.g., CPU 130b, memory 135b, etc.) of the destination host machine 101b and that provides functions such as inter-process communication, scheduling, virtual memory management, and so forth. In one example, host OS 120b comprises a destination hypervisor 115b that manages VMs 110b.

In one implementation, destination hypervisor 115b includes a destination migration agent 120b manages migration processes for VMs 110b executing on the destination host 101b. In one example, the destination migration agent 120b may coordinate with source migration agent 120a with respect to migration of VM 110a from source host 101a to destination host 101b. Migration agent 120b may be notified of the transfer of state of VM 110a, and may manage the initialization of VM 110a as VM 110b on destination host 101b.

When migration agent 120b receives the saved state of VM 110a, the migration agent 120b may cause VM 110b to initialize on destination host 101b using this received saved state. After the initialization of VM 110b has succeeded, the migration agent 120b may examine the migration caching disable attribute corresponding to the VM 110b. In one implementation, the migration caching disable attribute may be part of configuration data of the VM 110b maintained by the destination hypervisor 115b (once the VM 110b is initialized on destination host 101b). If the migration agent 120b determines that the migration caching disable attribute is set, then the migration agent 120b instructs a VM agent 112b of the VM 110b to re-enable in-memory caching in the VM 110b.

The VM agent 112b, in response to the instruction to re-enable in-memory caching, enabled in-memory caching in the VM 110b by modifying a caching primitive configured by the guest OS of the VM 110b. As discussed above, the caching primitive may include a dirty pages background ratio primitive. For example, in Linux™ OS, the dirty page background ratio is 'vm.dirty_background_ratio', which may be enabled by setting a value of this primitive to one. Once in-memory caching of the VM 110b is re-enabled, applications of the VM 110b may utilize cache 140b (i.e., virtualized portion of cache 140b assigned to the VM 110b) for improved disk I/O and faster performance.

In one implementation, when the migration caching disable attribute is not set, the migration agent 120a, 120b may proceed with the migration process without disabling in-memory caching in the VM 110a.

The "source" and "destination" designations for the hosts, hypervisors and migration agents are provided for reference purposes in illustrating example implementations of the migration process according to embodiments. It can be further appreciated that depending on the particulars of a given migration event, a hypervisor may at one time serve as the source hypervisor, while at another time the hypervisor may serve as the destination hypervisor.

Figure 2:
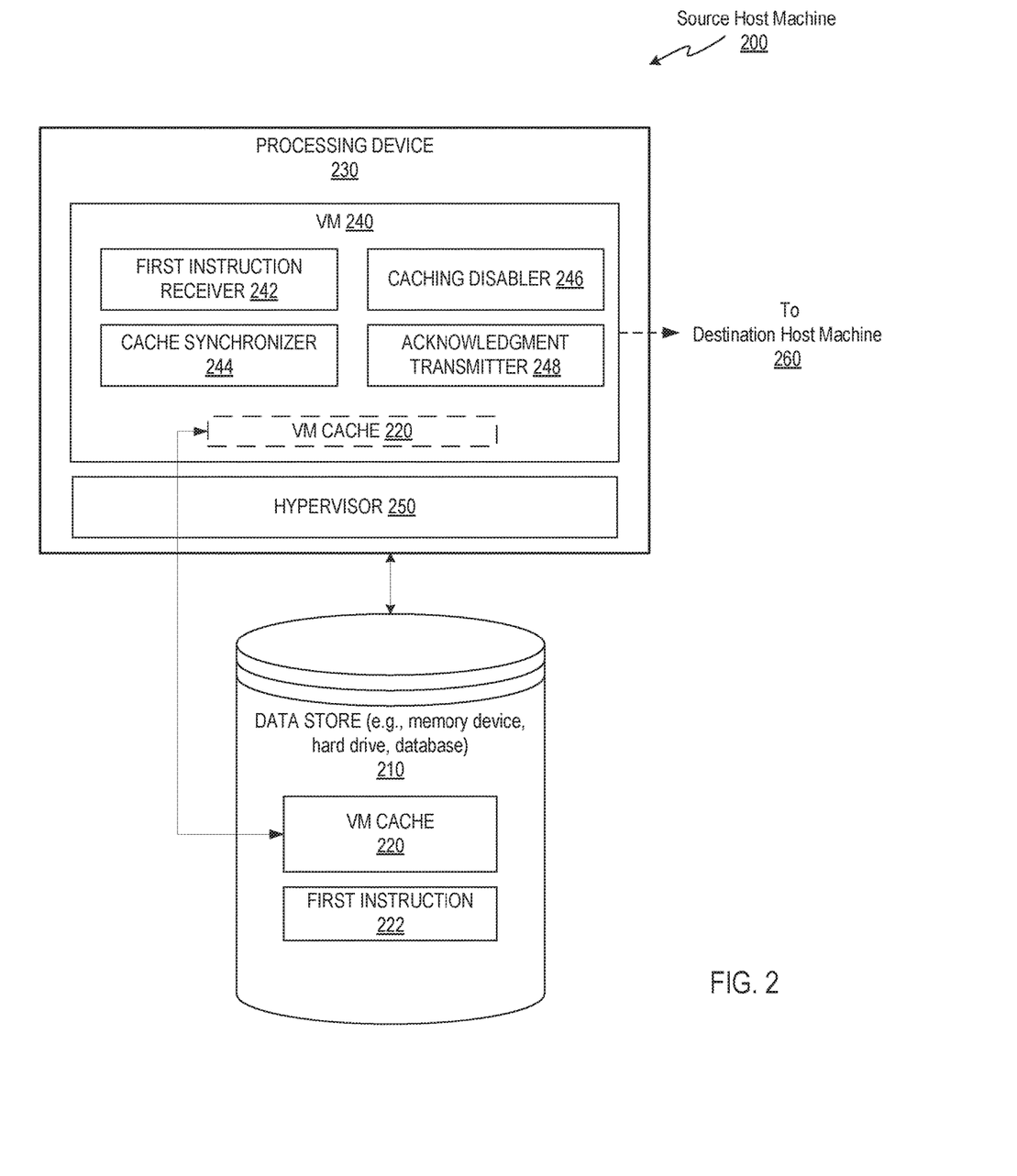
FIG. 2 schematically illustrates an example apparatus in which implementations of the disclosure may operate.

FIG. 2 illustrates an example source host machine in which implementations of the disclosure may operate. Source host machine 200 may be the same or similar to the source host machine 101A within the virtualization system 100 described with respect to FIG. 1. Source host machine 200 may include components and modules for disabling in-memory caching of a VM during migration. The source host machine 200 may include a data store 210 that can store a VM cache 220 and a first instruction 222. In one implementation, the VM cache 220 is memory (e.g., a page cache) of the source host machine 200 virtualized for use by VM 240. The VM cache 220 may also be referred to as in-memory cache of the VM 240. The data store 210 may include any non-persistent data storage (e.g., memory), persistent data storage (e.g., flash storage, hard drive, tape), other medium, or combination thereof that is capable of storing instructions for carrying out the operations of the components and modules discussed herein.

The source host machine 200 may include a processing device 230 with a VM 240 and a hypervisor 250. The VM 240 may include a first instruction receiver 242, a cache synchronizer 244, a caching disabler 246, and an acknowledgment transmitter 248. The VM 240 may implement disabling in-memory caching of the VM 240 during migration of the VM 240 from the source host machine 200 to a destination host machine 260.

The first instruction receiver 242 may receive a first instruction 222 to disable caching in the VM 240 as part of preparing the VM 240 for migration to the destination host machine 260. The cache synchronizer 244 may synchronize the cache 220 of the VM 240 responsive to the first instruction 222. The caching disabler 246 may disable caching in the VM 240. The acknowledgment transmitter 248 may send an acknowledgment of successful disablement of caching in the VM 240 to a hypervisor 250 of the source host machine 200.

Figure 3:
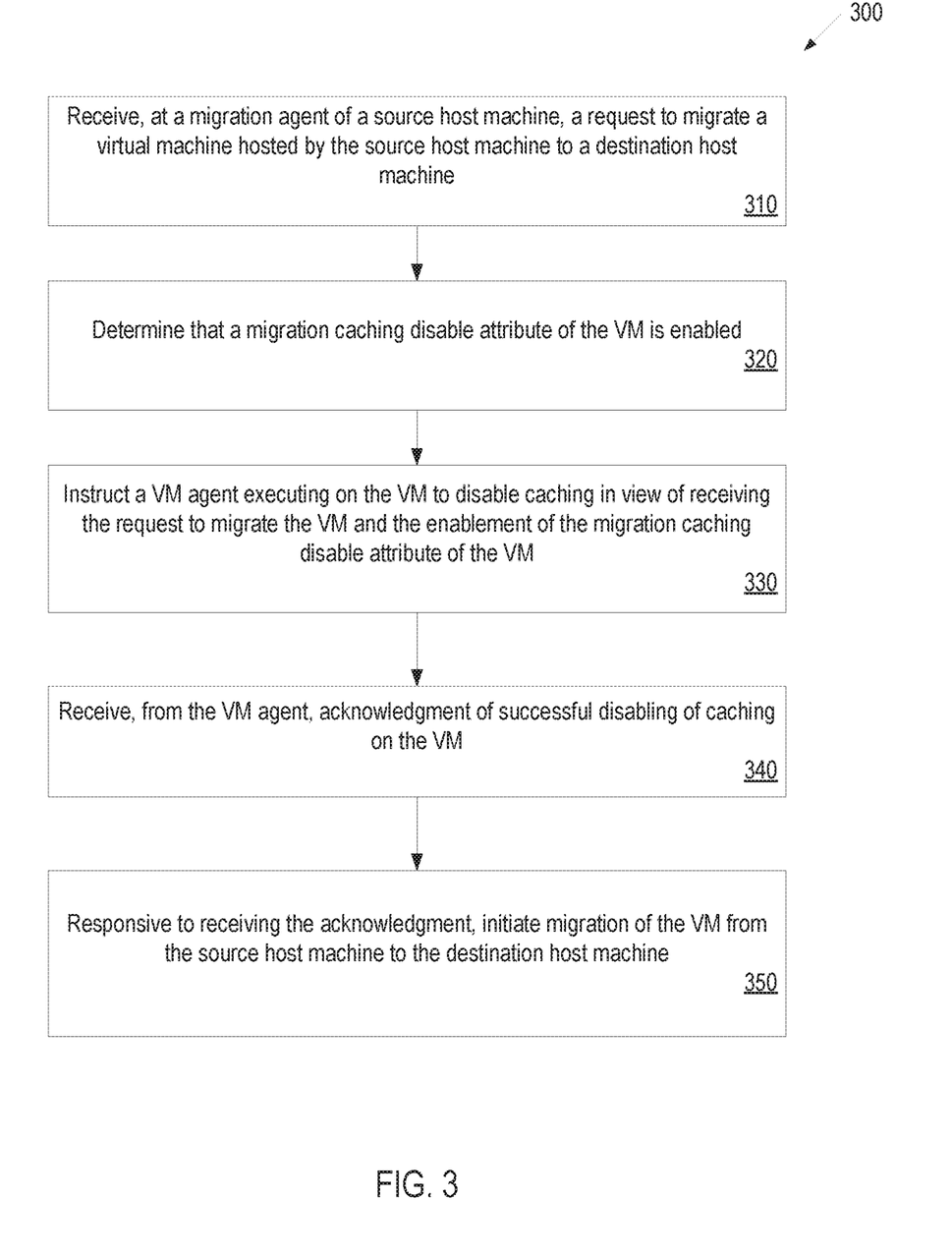
FIG. 3 depicts a flow diagram of a method of disabling in-memory caching of the VM during migration at a source host machine, in accordance with one or more aspects of the disclosure.
Figure 4:
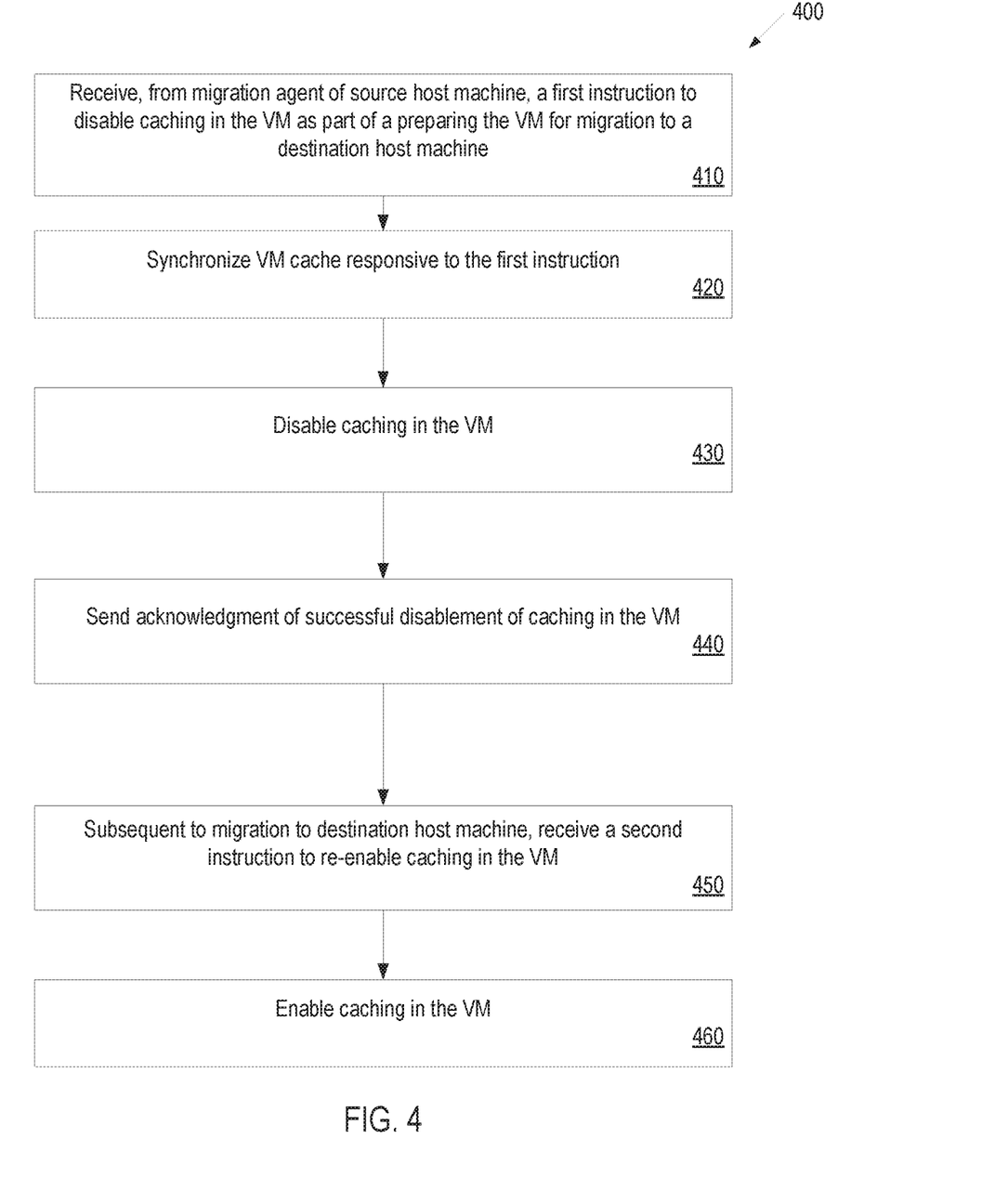
FIG. 4 depicts a flow diagram of a method of disabling, by a virtual machine, in-memory caching of the virtual machine during migration, in accordance with one or more aspects of the disclosure.
Figure 5:
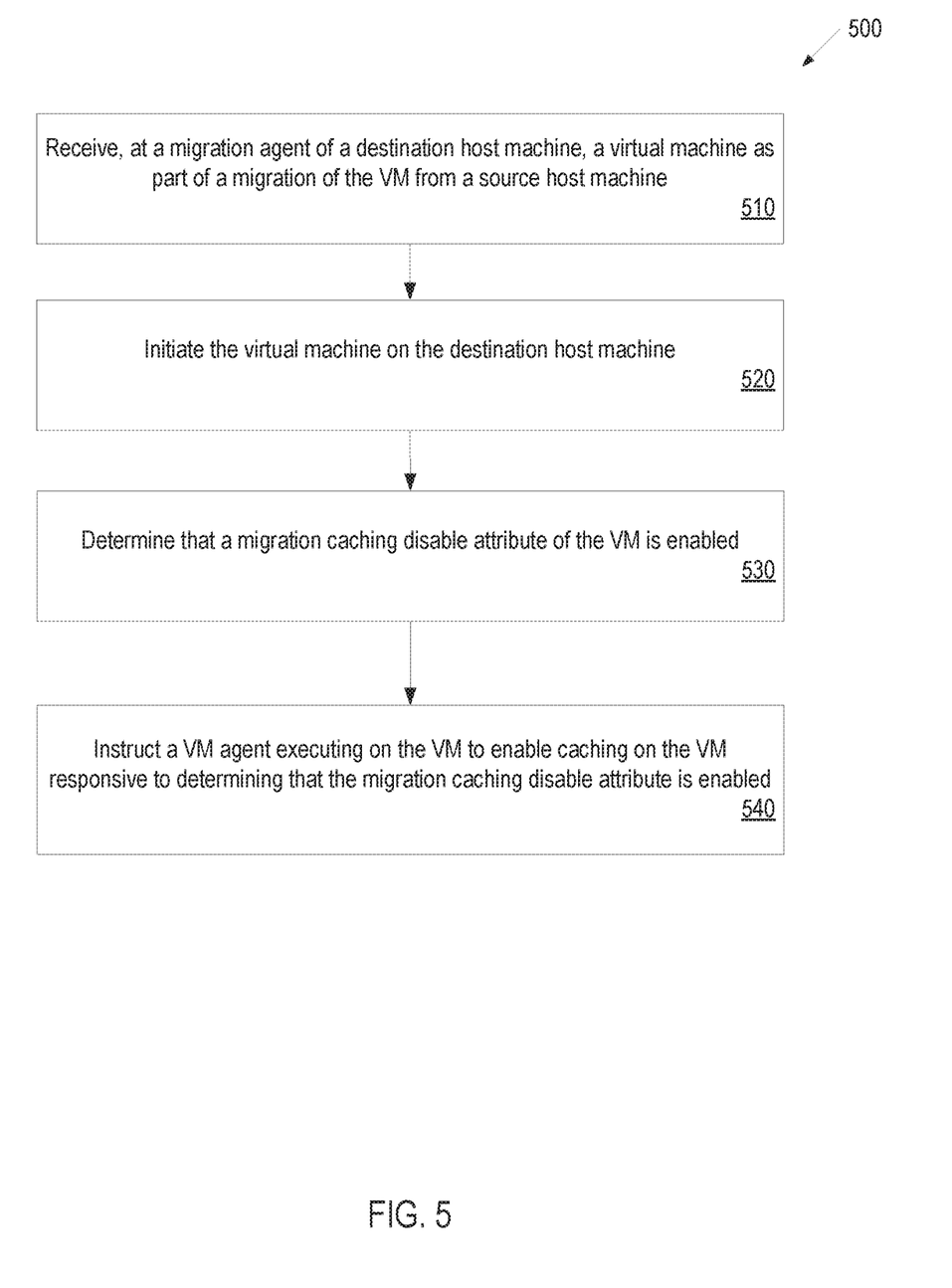
FIG. 5 depicts a flow diagram of a method of re-enabling disabled in-memory caching of a virtual machine for migration at a destination host machine, in accordance with one or more aspects of the disclosure.

FIGS. 3, 4 and 5 depict flow diagrams for illustrative examples of methods 300, 400, and 500 for disabling in-memory caching of the VM during migration. Method 300 includes a method of disabling in-memory caching of the VM during migration by a migration agent at a source host machine. Method 400 includes a method of disabling, by the VM, in-memory caching of the VM during migration. Method 500 includes a method of re-enabling disabled in-memory caching of a virtual machine for migration at a destination host machine. Methods 300, 400, and 500 may be performed by processing devices that may comprise hardware (e.g., circuitry, dedicated logic), computer readable instructions (e.g., run on a general purpose computer system or a dedicated machine), or a combination of both. Methods 300, 400 and 500 and each of their individual functions, routines, subroutines, or operations may be performed by one or more processors of the computer device executing the method. In certain implementations, methods 300, 400, and 500 may each be performed by a single processing thread. Alternatively, methods 300, 400, and 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 3, method 300 may be performed by a source host machine, such as source host machine 101a, as shown in FIG. 1. Method 300 may begin at block 310, where a processing device may receive, at a migration agent executed by the processing device of a source host machine, a request to migrate a virtual machine (VM) hosted by the source host machine to a destination host machine. At block 320, the processing device may determine, via the migration agent, that a migration caching attribute of the VM is enabled.

At block 330, the processing device may instruct, via the migration agent, a VM agent executing on the VM to disable caching of the VM in view of receiving the request to migrate the VM and determining that the migration caching attribute of the VM is enabled. Subsequently, at block 340, the processing device may receive, by the migration agent from the VM agent, acknowledgment of successful disablement of caching on the VM. Lastly, at block 350, the processing device may, responsive to receiving the acknowledgment, initiate migration of the VM from the source host machine to the destination host machine.

Referring to FIG. 4, method 400 may be performed by a VM executed by a host machine, such as VM 110a, 110b executed on a source host machine 101a, 101b, as shown in FIG. 1. Method 400 may begin at block 410, where a processing device may receive, at a VM executed by the processing device from a migration agent of a source host machine, a first instruction to disable caching in the VM as part of preparing the VM for migration to a destination host machine. At block 420, the processing device may synchronize a cache of the VM responsive to the first instruction. In one implementation, synchronizing the cache may include writing pending entries in the cache out to disk (e.g., flushing the cache) and, in some cases, zeroing out the entries in the cache. Subsequently, at block 430, the processing device may disable caching in the VM.

At block 440, the processing device may send an acknowledgment of successful disablement of caching in the VM to a hypervisor of the source host machine. At block 450, the processing device may receive a second instruction to re-enable caching in the VM subsequent to the initiating of the VM on the destination host machine. Lastly, at block 460, the processing device may enable caching in the VM responsive to the second instruction.

Referring to FIG. 5, method 500 may be performed by a destination host machine, such as destination host machine 101b, as shown in FIG. 1. Method 500 may begin at block 510, where a processing device may receive, at a migration agent executed by the processing device of a destination host machine, a virtual machine (VM) as part of a migration of the VM from a source host machine. At block 520, the processing device may initiate the VM on the destination host machine due to the migration. Subsequently, at block 530, the processing device may determine that a migration caching disable attribute of the VM is enabled. Lastly, at block 540, the processing device may instruct a VM agent executing on the VM to enable caching on the VM responsive to determining that the migration caching disable attribute is enabled.

Figure 6:
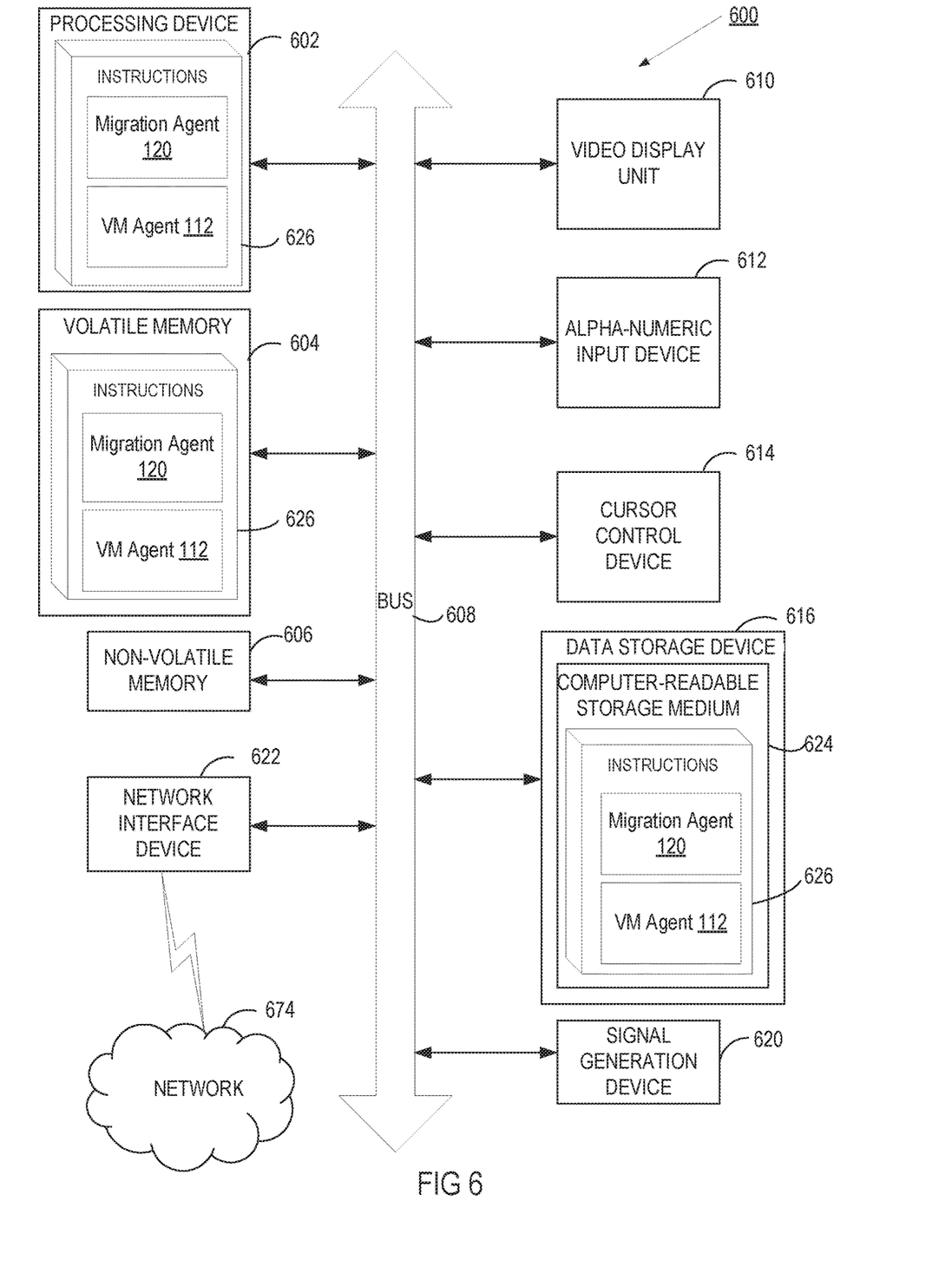
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to a computing device, such as host machine 101a, 101b of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for a migration agent 120 (e.g., 120a or 120b) of FIG. 1 for implementing methods 300 and/or 500 and/or for VM agent 112 (e.g., 112a or 112b) of FIG. 1 for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "utilizing," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400, and 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
    receiving, at a migration agent executed by a processing device of a source host machine, a request to migrate a virtual machine (VM) hosted by the source host machine, the request to migrate the VM to a destination host machine;
    determining, by the processing device via the migration agent, that a migration caching attribute of the VM is enabled, the migration caching attribute maintained as part of configuration information of the VM;
    responsive to determining that the migration caching attribute of the VM is enabled, instructing, by the processing device via the migration agent prior to initiating migration of the VM, a VM agent executing on the VM to disable caching of the VM, wherein the VM agent to disable caching by modifying a caching primitive of a guest operating system (OS) of the VM, the caching primitive corresponding to dirty page cache entries maintained by the VM;
    receiving, by the migration agent from the VM agent, acknowledgment of successful disablement of caching on the VM; and
    responsive to receiving the acknowledgement, initiating the migration of the VM from the source host machine to the destination host machine.

2. The method of claim 1, wherein instructing the VM agent to disable caching further comprises instructing the VM agent to flush a cache of the VM.

3. The method of claim 1, wherein instructing the VM agent to disable caching further comprises instructing the VM agent to zero out pages in a cache of the VM.

4. The method of claim 1, wherein the caching primitive comprises a dirty pages background ratio primitive.

5. The method of claim 1, wherein the caching primitive is modified with a value of zero.

6. The method of claim 1, wherein a destination VM agent on the destination host machine to initialize the VM on the destination host machine as part of migration of the VM and to instruct the VM agent of the VM to re-enable caching on the VM in response to successful initiation of the VM on the destination host machine.

7. A source host machine comprising,
a memory; and
a processing device operatively coupled to the memory, the processing device to:
receive, at a VM executed by the processing device prior to migration of the VM to a destination host machine, a first instruction to disable caching in the VM as part of preparing the VM for the migration to the destination host machine;
synchronize a cache of the VM responsive to the first instruction;
disable caching in the VM prior to the migration of the VM to the destination host machine, wherein a migration caching attribute maintained as part of configuration information of the VM is enabled to indicate that the caching of the VM is disabled, and wherein the VM is to disable caching by modifying a caching primitive of a guest operating system (OS) of the VM, the caching primitive corresponding to dirty page cache entries maintained by the VM; and
send an acknowledgement of successful disablement of caching in the VM to a hypervisor of the source host machine.

8. The source host machine of claim 7, wherein the processing device is further to:
receive a second instruction to re-enable caching in the VM subsequent to initialization of the VM on the destination host machine; and
enable caching in the VM responsive to the second instruction.

9. The source host machine of claim 8, wherein the second instruction to enable caching is received from a destination migration agent of a destination hypervisor of the destination host machine.

10. The source host machine of claim 8, wherein a destination VM agent on the destination host machine to initialize the VM on the destination host machine as part of migration of the VM and to send a third instruction to the destination VM agent to re-enable caching on the VM in response to successful initiation of the VM on the destination host machine.

11. The source host machine of claim 7, wherein the first instruction to disable caching is received from a source migration agent of a source hypervisor of the source host machine and wherein the acknowledgement is sent to the migration agent.

12. The source host machine of claim 7, wherein instructing the VM to disable caching further comprises instructing the VM to zero out pages in the cache of the VM.

13. The source host machine of claim 7, wherein the caching primitive comprises a dirty pages background ratio primitive.

14. A non-transitory machine-readable storage medium storing instructions that cause a processing device to:
receive, at a migration agent executed by the processing device of a destination host machine, a virtual machine (VM) as part of a migration of the VM from a source host machine;
initialize the VM on the destination host machine as part of the migration;
determine, by the processing device, that a migration caching disable attribute of the VM is enabled, wherein the migration caching disable attribute of the VM is enabled prior to the migration of the VM to the destination host machine, wherein the migration caching attribute is maintained as part of configuration information of the VM; and
instruct, by the processing device, a VM agent executing on the VM to enable caching on the VM responsive to determining that the migration caching disable attribute is enabled, wherein caching on the VM is enabled by modifying a caching primitive of a guest operating system (OS) of the VM, the caching primitive corresponding to dirty page cache entries maintained by the VM.

15. The non-transitory machine-readable storage medium of claim 14, wherein caching on the VM is disabled at the source host machine prior to migration of the VM to the destination host machine.

16. The non-transitory machine-readable storage medium of claim 15, wherein disabling caching further comprises synchronizing a cache of the VM and zeroing out pages in the cache of the VM.

17. The non-transitory machine-readable storage medium of claim 14, wherein the caching primitive comprises a dirty pages background ratio primitive, and wherein the caching primitive is modified with a value of one.

* * * * *